No. 12,089. REISSUED MAR. 3, 1903.
N. W. CONDICT.
STILL FOR ABSORPTION REFRIGERATING APPARATUS.
APPLICATION FILED DEC. 19, 1902.
2 SHEETS—SHEET 1.
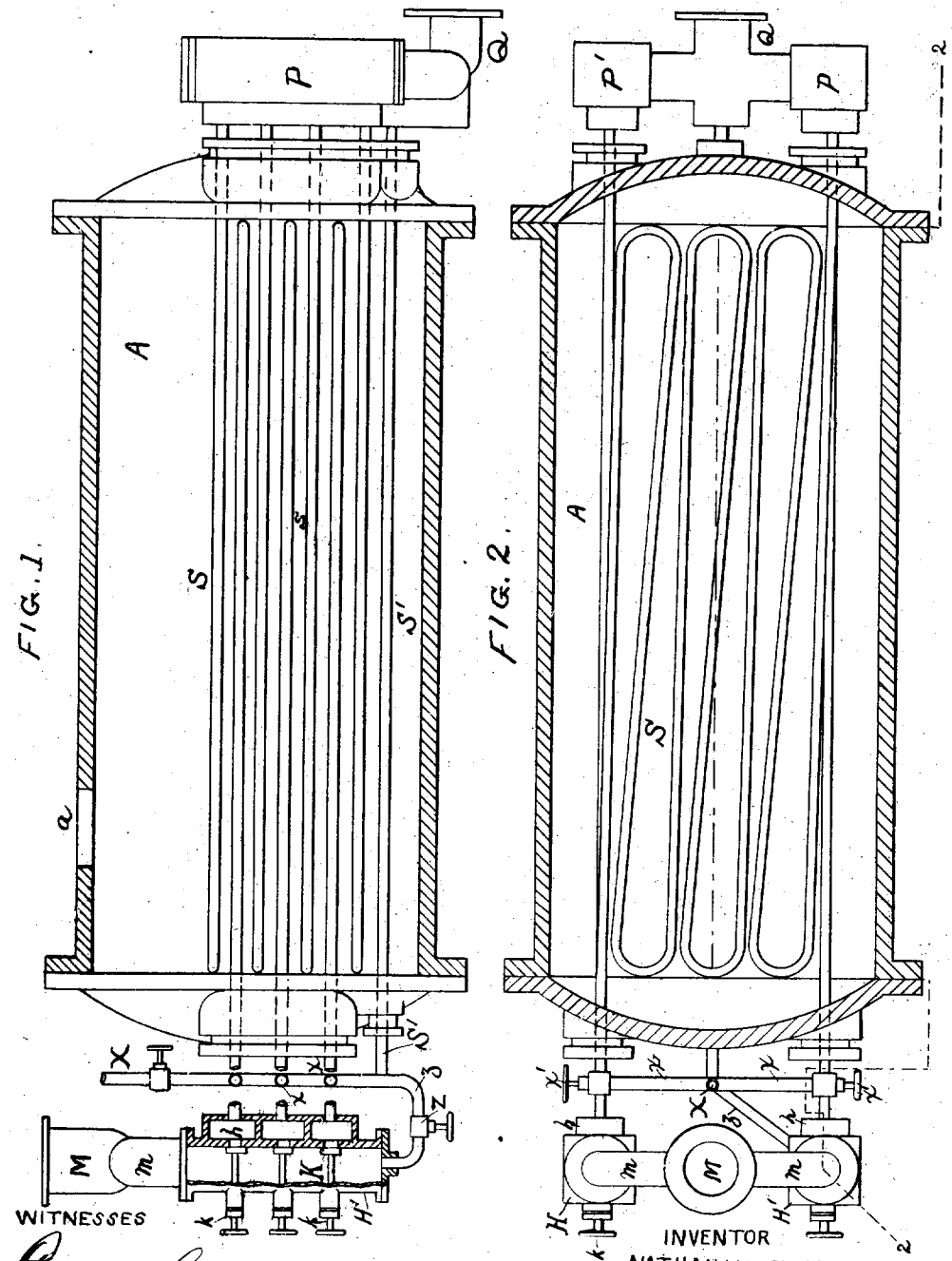

No. 12,089. REISSUED MAR. 3, 1903.

N. W. CONDICT.

STILL FOR ABSORPTION REFRIGERATING APPARATUS.

APPLICATION FILED DEC. 19, 1902.

2 SHEETS—SHEET 2.

WITNESSES

P. W. Wright

Walter Abbe

INVENTOR

NATHAN W. CONDICT

BY Howson & Howson

ATTORNEYS

UNITED STATES PATENT OFFICE.

NATHAN W. CONDICT, OF JERSEY CITY, NEW JERSEY.

STILL FOR ABSORPTION REFRIGERATING APPARATUS.

SPECIFICATION forming part of Reissued Letters Patent No. 12,089, dated March 3, 1903.

Original No. 706,901, dated August 12, 1902. Application for reissue filed December 19, 1902. Serial No. 135,910.

*To all whom it may concern:*

Be it known that I, NATHAN W. CONDICT, a citizen of the United States of America, residing in Jersey City, county of Hudson, State of New Jersey, have invented an Improved Still for Absorption Refrigerating Apparatus, of which the following is a specification.

My invention has reference more particularly to that class of refrigerating apparatus which works by the absorption process; and the main object of my invention is to so construct the apparatus as to improve the operation of generating the gas and also to enable the generation of the gas to be under more perfect control.

Figure 3:
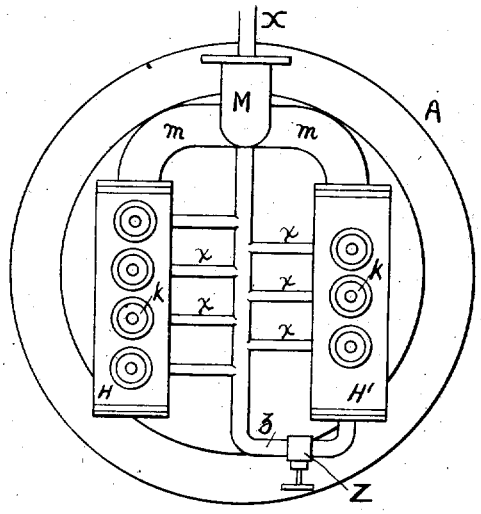
Figure 4:
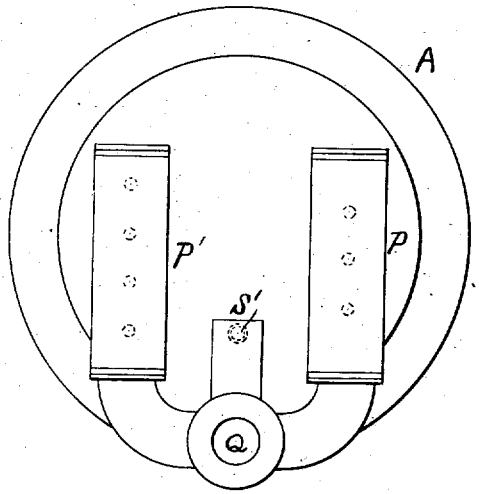

In the accompanying drawings, Figure 1 is a vertical section of my improved still on the line 2 2, Fig. 2. Fig. 2 is a sectional plan view taken through the still. Fig. 3 is an elevation of the front end of the still, and Fig. 4 is an elevation of the rear end of the same.

I make the main body or generating-chamber of the still in the form of a horizontal cylinder A. My still is so constructed that either exhaust-steam or live steam, or both, may be employed, as convenience may dictate. For this purpose I arrange the steam-coils S in the liquor-space in the horizontal cylinder A in several independent sets. In this case they are in horizontal layers, each layer being coiled in the serpentine form shown in the plan view, Fig. 2. In the drawings I have shown eight of these horizontal serpentine coils over each other, each coil being connected at opposite ends to headers H H′ and P P′. The upper seven superposed coils S are connected at the front end to the inlet-headers H H′, the ends of four coils being connected to one header H, while the ends of the other four coils are connected to the other header H′. Each pipe end opens into its separate box *h* in the header, admission to which from the common steam-space K is controlled by an independent hand-valve *k*, Fig. 1. The common steam-spaces K of the two headers are connected to the inlet-pipe M for the exhaust-steam by branches *m*, so that by opening the appropriate valve or valves *k* the exhaust-steam can be admitted to any of the coils S in the still. In order that live steam may be used, however, when desired, I provide a live-steam-supply pipe, such as X, which may be connected to the bottom coil S′ and also connected by branches *x* to the inlet ends of the other coils, or some of them, between the headers H H′ and the still. Valves *x′* are provided to control the admission of steam to the several coils. A branch *z*, with valve Z from the live-steam pipe X, can be used to admit live steam to the headers H H′ when desired. The relation of the amount of heating-surface furnished by the coils to the quantity of liquor in which these coils are submerged in the cylinder is an important fact in the efficient working of the apparatus. For a given normal quantity of liquor in the horizontal cylinder the amount of the heating-surface in that quantity of liquor should be changed with the tension or temperature of the steam. Thus when exhaust-steam is used all the coils which can be put in the liquor-space of the horizontal cylinder A will be required; but when live steam is used only a few of the coils will be needed for the efficient operation of the apparatus.

The outlet ends of the coils S and S′ pass through the rear of the still A into headers P′ P′, leading to a common outlet Q. These coils S, which lead at the inlet end from the header H, have their outlet ends at the diagonally opposite corner connected to the header P, Fig. 3. In like manner the coils which have their inlets connected to the header H′ have their outlets connected to the header P′. The successive superposed coils S are thus connected to the inlet-headers H′ H′ at opposite sides of the still alternately. This enables me to place the superposed coils much closer together than would be possible if the adjacent coils had to have their stuffing-boxes adjacent to each other. By this means I am enabled to crowd into the liquor-space of the horizontal cylinder a sufficient number of coils to give the extended heating-surface required when using exhaust or low-tension steam in proportion to the normal quantity of liquor covering these coils.

The construction of the coils in horizontal serpentine form is not only convenient for manufacture, but gives an extended heating-surface, and in addition the construction of independent superposed coils has this further advantage that in case the level of liqnor in the retort descends below the level of the top coil of pipe, for instance, as shown by the gage, such top coil can be cut out of the circulation and the desired proportion of heating-surface to the quantity of liquor be maintained.

I claim as my invention—

1. In an ammonia-still for refrigerating purposes, the combination of the generating-chamber of the still and steam-coils therein, with two connected headers at the inlet end and two connected headers at the outlet end, the headers at the inlet end having valves to control the admission of steam to the different coils and means for supplying steam from different sources to the inlet-headers.

2. In an ammonia-still for refrigerating purposes, the combination of the generating-chamber of the still with steam-coils in horizontal serpentine layers, these successive layers having their inlets at opposite sides of the still alternately and connections for the admission of steam to the said coils.

3. In an ammonia-still for refrigerating purposes, the combination of the horizontal still and steam-coils in horizontal serpentine layers each with its inlet at one end of the still and its outlet at the other end of the still, and the successive layers having their inlets at opposite sides of the still alternately, with a live-steam supply and an exhaust-steam supply, and valves to control the admission from either supply to the coils.

4. In an ammonia-still for refrigerating purposes, the combination of the horizontal cylindrical still with steam-coils in independent sets in the liquor-space in said cylinder, and both a live-steam-supply pipe and an exhaust-steam-supply pipe and valves controlling admission therefrom to the several independent coils whereby the relation of the quantity of heating-surface to the normal body of liquor in which the coils are submerged may be varied according to the steam used.

In testimony whereof I have signed my name to this specification in the presence of two subscribing witnesses.

NATHAN W. CONDICT.

Witnesses:

HUBERT HOWSON,

F. WARREN WRIGHT.